United States Patent
Liu et al.

(10) Patent No.: US 11,536,263 B2
(45) Date of Patent: Dec. 27, 2022

(54) AIR PRESSURE SYSTEM

(71) Applicant: Hitachi Industrial Equipment Systems Co., Ltd., Tokyo (JP)

(72) Inventors: Yaping Liu, Tokyo (JP); Minoru Koizumi, Tokyo (JP)

(73) Assignee: Hitachi Industrial Equipment Systems Co., Ltd., Tokyo (JP)

( * ) Notice: Subject to any disclaimer, the term of this patent is extended or adjusted under 35 U.S.C. 154(b) by 139 days.

(21) Appl. No.: 16/959,910

(22) PCT Filed: Jan. 16, 2019

(86) PCT No.: PCT/JP2019/001157
§ 371 (c)(1),
(2) Date: Jul. 2, 2020

(87) PCT Pub. No.: WO2019/142840
PCT Pub. Date: Jul. 25, 2019

(65) Prior Publication Data
US 2021/0108632 A1    Apr. 15, 2021

(30) Foreign Application Priority Data
Jan. 17, 2018 (JP) .............................. JP2018-005284

(51) Int. Cl.
*F04B 49/06* (2006.01)
*F04B 35/06* (2006.01)
(Continued)

(52) U.S. Cl.
CPC ............ *F04B 49/065* (2013.01); *F04B 35/06* (2013.01); *F04B 41/02* (2013.01); *F04B 49/00* (2013.01);
(Continued)

(58) Field of Classification Search
CPC ........ F04B 41/02; F04B 49/065; F04B 35/06; F04B 2205/05; F04B 49/06; F04B 49/08;
(Continued)

(56) References Cited

U.S. PATENT DOCUMENTS 4,480,654 A * 11/1984 Firey ...................... F04B 41/02
417/442
6,834,666 B2 * 12/2004 Murayama .............. F15B 11/16
251/149.6
(Continued)

FOREIGN PATENT DOCUMENTS

JP    2003-21071 A    1/2003
JP    2003-21091 A    1/2003
(Continued)

OTHER PUBLICATIONS

International Preliminary Report on Patentability (PCT/IB/338 & PCT/IB/373) issued in PCT Application No. PCT/JP2019/001157 dated Jul. 30, 2020, including English translation of document C2 (Japanese-language Written Opinion (PCT/ISA/237) previously filed on Jul. 2, 2020) (eight (8) pages).
(Continued)

*Primary Examiner* — Peter J Bertheaud
(74) *Attorney, Agent, or Firm* — Crowell & Moring LLP

(57) ABSTRACT

There is provided an air pressure system for controlling an air compressor in real time in accordance with the actual usage of compressed air by a plurality of terminals. Furthermore, in case pressure losses change abruptly, unwanted electric power is prevented from being consumed by a stable operation free of response delays on the basis of a predicted model that assesses time lags of volume responses. There is provided an air pressure system for supplying compressed air discharged from an air compressor through an air tank and a piping system to a plurality of terminals that consume the compressed air, including a compressor pressure sensor
(Continued)

for measuring the pressure of compressed air discharged from the air compressor, a plurality of terminal pressure sensors for measuring the pressures of compressed air supplied respectively to the terminals, a flow rate difference calculating device for calculating deviation information on the basis of a capacity of the air tank, information on the piping system, the pressure of compressed air discharged from the air compressor, and the pressures of compressed air supplied respectively to the terminals, and a control device for controlling operation of the air compressor on the basis of the deviation information.

6 Claims, 13 Drawing Sheets

(51) Int. Cl.
| | |
|---|---|
| *F04B 41/02* | (2006.01) |
| *F04B 49/08* | (2006.01) |
| *F04B 49/00* | (2006.01) |
| *F04B 49/02* | (2006.01) |
| *F04B 49/10* | (2006.01) |

(52) U.S. Cl.
CPC ............ *F04B 49/02* (2013.01); *F04B 49/022* (2013.01); *F04B 49/06* (2013.01); *F04B 49/08* (2013.01); *F04B 49/10* (2013.01); *F04B 2205/05* (2013.01); *F04B 2205/09* (2013.01)

(58) Field of Classification Search
CPC ........ F04B 49/022; F04B 49/00; F04B 49/02; F04B 49/10; F04B 2205/09
See application file for complete search history.

(56) References Cited

U.S. PATENT DOCUMENTS

| | | | |
|---|---|---|---|
| 7,722,333 B2* | 5/2010 | DeRosa ................. | F04C 23/00 417/234 |
| 8,257,053 B2* | 9/2012 | Hase ...................... | F04B 41/06 417/18 |
| 10,550,837 B2* | 2/2020 | Yashiki ................. | F04B 49/106 |
| 2018/0372086 A1 | 12/2018 | Yashiki et al. | |

FOREIGN PATENT DOCUMENTS

| | | |
|---|---|---|
| JP | 2009-13961 A | 1/2009 |
| JP | 2010-24845 A | 2/2010 |
| JP | 4425768 B2 | 3/2010 |
| JP | 2017-115730 A | 6/2017 |

OTHER PUBLICATIONS

International Search Report (PCT/ISA/210) issued in PCT Application No. PCT/JP2019/001157 dated Apr. 2, 2019 with English translation (three (3) pages).
Japanese-language Written Opinion (PCT/ISA/237) issued in PCT Application No. PCT/JP2019/001157 dated Apr. 2, 2019 (four (4) pages).

* cited by examiner

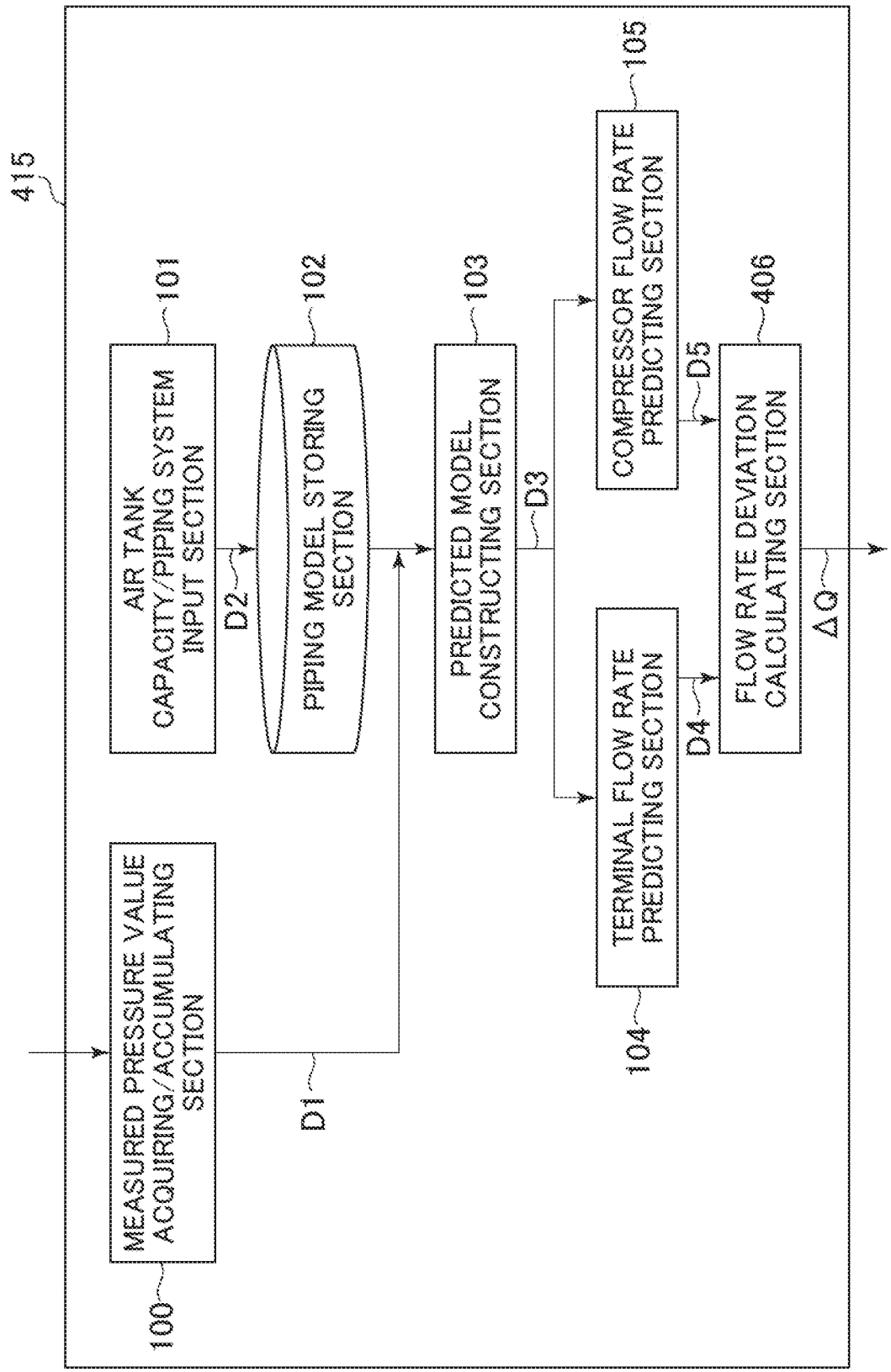

AIR PRESSURE SYSTEM

TECHNICAL FIELD

The present invention relates to an air pressure system.

BACKGROUND ART

Air pressure systems that supply compressed air to various places in factories represent a piping facility for temporarily accumulating compressed air compressed by an air compressor in an air tank and supplying the compressed air from the air tank through a piping system and air pressure devices such as filters, driers, control valves, and the like to devices or terminals such as air cylinders, air blowers, and the like in the factories that consume the compressed air during production processes in the factories. In the air piping systems that extend from the discharge ports of the air compressors to the terminals, the closer to the terminals, the higher the pressure losses. The pressure loss changes due to a change in the rate of air discharged from the air compressor and also changes in the rates of air used by the terminals. Furthermore, as the terminals are not limited to being used at one place, the pressure losses change greatly owing to varying rates of air used by the respective terminals.

Consequently, it is general practice to establish a high setting for the pressure of air discharged from the air compressor to allow for a maximum pressure loss in order to keep the pressures of compressed air supplied to the terminals equal to or higher than a predetermined pressure. However, the rates of air used by the terminals often vary depending on the production processes, and the rates and pressures of air used by the terminals are likely to differ from day to day. If the rate of air used by a terminal is lower, the pressure loss is lower, causing the terminal to operate under an unnecessarily high pressure. At the same time, if a setting for the pressure of air discharged from the air compressor is constant, the pressure of the discharged air may rise unnecessarily, resulting in the problem that excessive electric power may be consumed.

For stabilizing the supplied pressures while achieving an energy saving effect, it has heretofore been customary to perform a constant terminal pressure control reliant on variations in the rates of air used by the terminals. Specifically, the constant terminal pressure control is a method for changing the pressure of air discharged from the air compressor in order to keep constant the pressures of air supplied to the terminals. There are two approaches available to perform the constant terminal pressure control method, i.e., an estimated terminal pressure control and a measured terminal pressure control. The estimated terminal pressure control is a control based on estimated pressure losses. With regard to estimated values of pressure loss, the estimated terminal pressure control is carried out using a piping system model in a steady state to allow for a maximum pressure loss.

Furthermore, according to the estimated terminal pressure control, in case the relationship between the rates of compressed air used and the pressure losses in the piping system is not clear, there has been proposed an operation control method in which pressure losses in a piping system with respect to arbitrary rates of air used are inspected ahead of time and upper and lower limit settings for the pressure of air discharged from a screw air compressor whose rotational speed is constant are changed, as disclosed in Patent Document 1.

The measured terminal pressure control is a control based on the measured values of pressures at terminals. For example, there has been proposed, as disclosed in Patent Document 2, a method in which a header includes a pressure detecting device that sends a pressure signal to a control apparatus for an air compressor, which calculates a new setting value for a discharged pressure from deviations of measured pressures at terminals from a set pressure, and an inverter changes the rotational speed of an electric motor of a rotational-speed-controllable air compressor for controlling the air compressor.

On the other hand, as disclosed in Patent Document 3, there has been proposed a method in which pressure detecting devices are provided near respective terminals, and a new setting value for a discharged pressure is calculated from variations in the pressure differences between the outlet of an air compressor and the respective terminals, for controlling the air compressor.

PRIOR ART DOCUMENTS

Patent Documents

Patent Document 1: Japanese Patent No. 4425768
Patent Document 2: JP-2009-013961-A
Patent Document 3: JP-2010-024845-A

SUMMARY OF THE INVENTION

Problems to be Solved by the Invention

With general air pressure systems, it is difficult to directly obtain rates of air used because flow rate detecting devices are expensive. According to the prior art described above, each of the control methods measures or predicts terminal pressures and changes the pressure of air discharged from the air compressor in order to minimize an excessive pressure that is supplied, by way of pressure monitoring.

However, since the arrangement of a piping and the like differs from terminal to terminal, pressure losses are developed in the piping from the air compressor to the terminals. Furthermore, time lags, e.g., ranging several tens of seconds to several minutes, from a change in the pressure of air discharged from the air compressor to changes in the pressures at the terminals are different between the terminals due to compression and expansion of air, making it difficult to control the air compressor as the relationship between the rates of air supplied to the terminals and the pressure of air discharged from the air compressor is not clear.

There has been proposed a method for inspecting in advance and storing pressure losses in a piping system with respect to optional rates of air used. However, inasmuch as the pressure losses in the piping system with respect to the rates of air used are nonlinear, it is difficult to make calculations especially with respect to complex piping systems in case conditions are changed, resulting in the problem that the advance inspection tends to cause large errors. In addition, it is tedious and time-consuming to accumulate data.

There has also been proposed a method in which a header includes a pressure detecting device that sends a pressure signal to a control apparatus for an air compressor, which calculates a new setting value for a discharged pressure from deviations of measured pressures at terminals from a set pressure, for controlling the air compressor. However, since the closer to the terminals, the larger the pressure losses are, there is generally a problem in that the pressure at the header and the pressures of air supplied to the terminals are not equal to each other. If the pressure deviations are used directly as corrective pressures, then the air pressure system is controlled unstably.

There has further been proposed a method in which pressure detecting devices are provided near respective terminals, and a new setting value for a discharged pressure is calculated from variations in the pressure differences between the outlet of an air compressor and the respective terminals, for controlling the air compressor. However, in case pressure losses change abruptly, there arises a problem in that response delays occur due to the volume of the piping system. Moreover, cases where there are no pressure sensors and cases where pressure sensors fail cannot be dealt with.

The present invention has been made in view of the above problems. It is an object of the present invention to provide an apparatus for controlling an air compressor in real time to discharge air to a plurality of terminals at a rate required by rates of air used thereby from the standpoint of flow rate control in view of the capacity of an air tank and the volume of a piping system which are responsible for response delays.

Means for Solving the Problems

In order to achieve the above object, there is provided in accordance with the present invention an air pressure system for supplying compressed air discharged from an air compressor through an air tank and a piping system to a plurality of terminals that consume the compressed air, including: a compressor pressure sensor for measuring pressure of compressed air discharged from the air compressor; a plurality of terminal pressure sensors for measuring pressures of compressed air supplied respectively to the terminals; a flow rate difference calculating device for calculating deviation information on a basis of a capacity of the air tank, information on the piping system, the pressure of compressed air discharged from the air compressor, and the pressures of compressed air supplied respectively to the terminals, and a control device for controlling operation of the air compressor on a basis of the deviation information.

Advantages of the Invention

According to the present invention, the air compressor can be controlled in real time according to a method of supplying compressed air to the terminals without wastefully using compressed air in a manner to match the actual usage of compressed air. Furthermore, in case pressure losses change abruptly, unwanted electric power is prevented from being consumed by a stable operation free of response delays on the basis of a predicted model that assesses time lags of volume responses.

BRIEF DESCRIPTION OF THE DRAWINGS

FIG. 14 is an explanatory diagram of a processing sequence of a flow rate difference calculating device in an air pressure system according to a fourth embodiment of the present invention.

MODES FOR CARRYING OUT THE INVENTION

Air pressure control systems according to modes for carrying out the invention (hereinafter referred to as "embodiments") will hereinafter be described below with reference to the drawings.

First Embodiment

Figure 1:
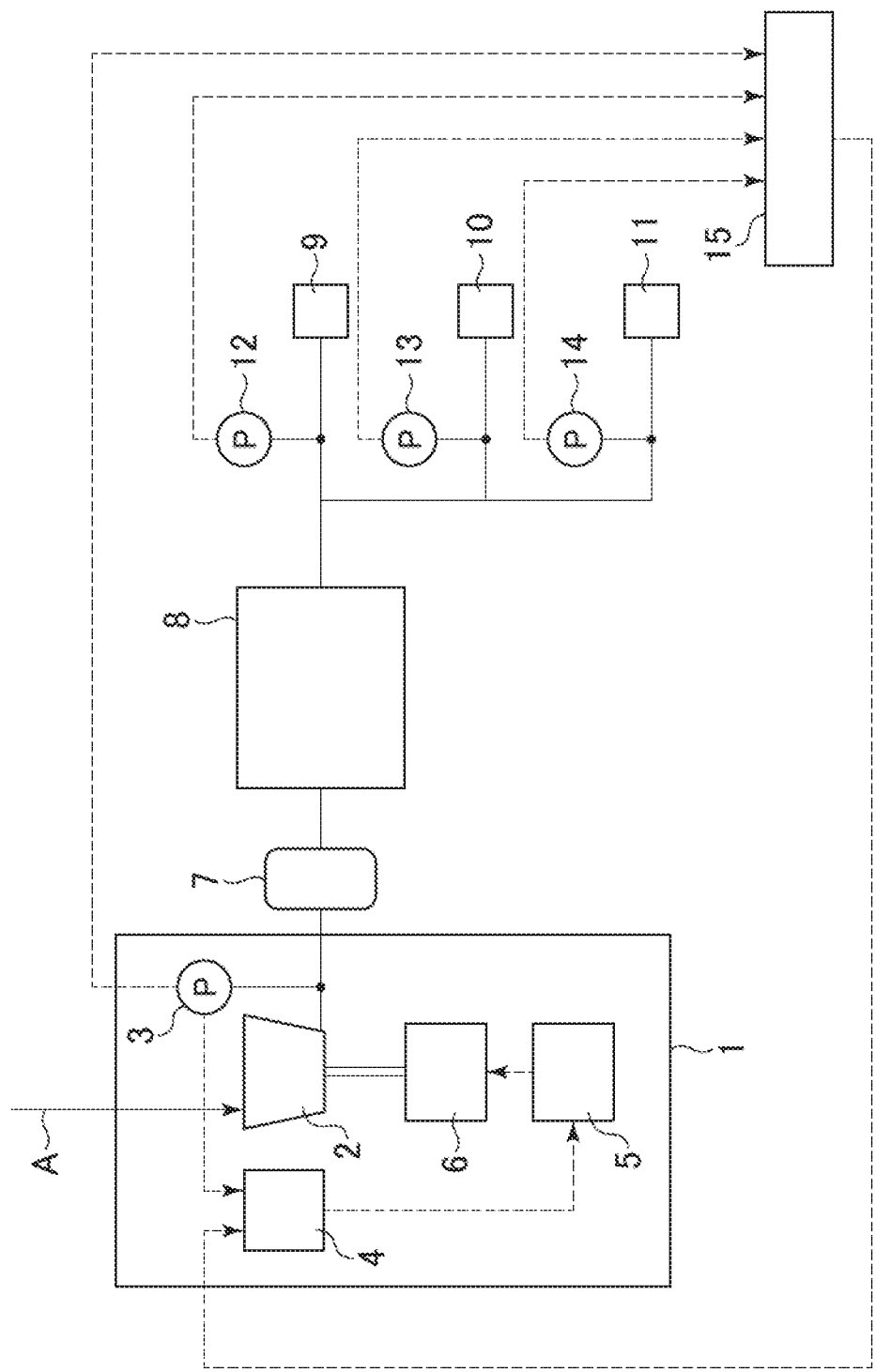
FIG. 1 is a schematic configurational diagram of an air pressure system according to a first embodiment of the present invention.

FIG. 1 is a schematic configurational diagram of an air pressure system according to a first embodiment of the present invention.

The air pressure system illustrated in FIG. 1 includes an air compressor unit 1, an air tank 7, a piping system 8, terminals 9 through 11, terminal pressure sensors 12 through 14, and a flow rate difference calculating device 15.

The air compressor unit 1 compresses air A drawn in from the atmosphere and discharges compressed air. The air compressor unit 1 includes an air compressor main body 2, i.e., an air compressor, an air compressor discharge-part pressure sensor 3, i.e., an air compressor pressure sensor, a control device 4, a variable-speed device 5, and an electric motor 6. The general configuration of the air compressor unit 1 will hereinafter be described below.

The air compressor main body 2 draws in and compresses the air A.

The air compressor discharge-part pressure sensor 3 measures the pressure of the compressed air discharged from the air compressor main body 2. The measured pressure value is output to the control device 4 and the flow rate difference calculating device 15.

The control device 4 is supplied with input represented by the measured pressure value from the air compressor discharge-part pressure sensor 3 and a flow rate difference value from the flow rate difference calculating device 15, and controls the rotational speed of the electric motor 6 in order to zero the flow rate difference value. The control device 4 calculates and outputs a rotational speed command value for the electric motor 6. A specific calculating process for calculating a rotational speed command value for controlling the rotational speed of the electric motor 6 can be realized by the method disclosed in Patent Document 2, for example.

The variable-speed device 5 is supplied with an input represented by the rotational speed command value and outputs electric power required to rotate the electric motor 6 at a designated rotational speed.

The electric motor 6 is coupled to the air compressor main body 2 by a rotational shaft, and is rotated by the electric power input thereto to actuate the air compressor main body 2.

The general configuration of the air compressor unit 1 has been described above.

The air tank 7 is an apparatus for storing the compressed air supplied from the air compressor. The magnitude of the capacity of the air tank is responsible for response delays.

The piping system 8 includes devices including a filter, a drier, a piping, elbows, branches, valves, and the like. The compressed air discharged from the air tank 7 is supplied through the piping system 8 to the terminals 9 through 11.

The terminal pressure sensors 12 through 14 measure pressures of the compressed air supplied to the terminals 9 through 11. Measured pressure values are output to the flow rate difference calculating device 15.

The flow rate difference calculating device 15 is supplied with input represented by the measured pressure value from the air compressor discharge-part pressure sensor 3 and the measured pressure values from the terminal pressure sensors 12 through 14, and outputs a deviation ΔQ of rates of air used by the terminals 9 through 11 from a rate of air discharged from the air compressor.

Figure 2:
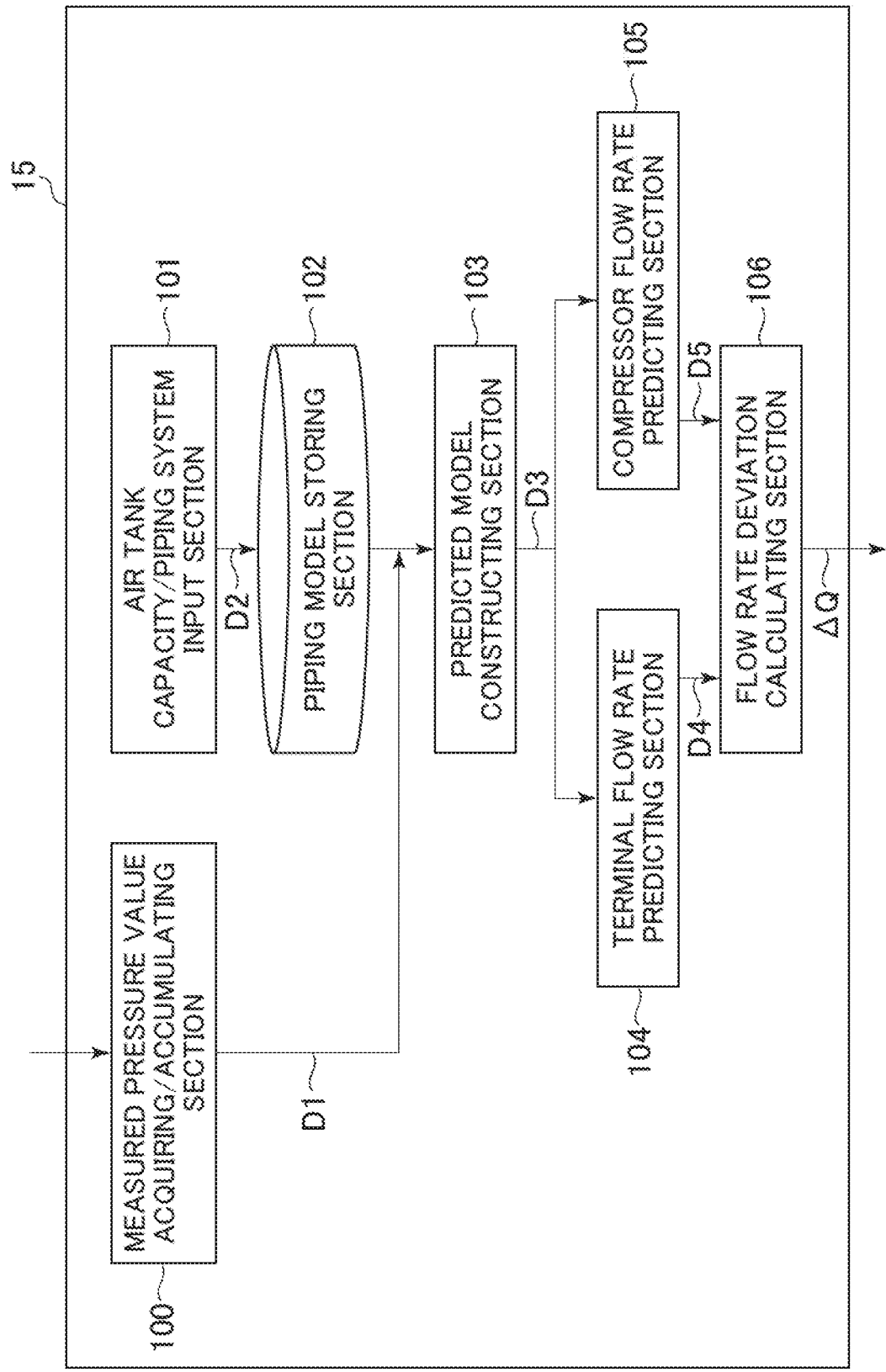
FIG. 2 is a schematic configurational diagram of a flow rate difference calculating device in the air pressure system according to the first embodiment of the present invention.

Details of the flow rate difference calculating device 15 will hereinafter be described below with reference to FIG. 2. The flow rate difference calculating device 15 includes a measured pressure value acquiring/accumulating section 100, an air tank capacity/piping system input section 101, a piping model storing section 102, a predicted model constructing section 103, a terminal flow rate predicting section 104, a compressor flow rate predicting section 105, and a flow rate deviation calculating section 106.

The measured pressure value acquiring/accumulating section 100 acquires and stores the measured pressure value from the air compressor discharge-part pressure sensor 3 and the measured pressure values from the terminal pressure sensors 12 through 14, and outputs measured sensor values D1.

The air tank capacity/piping system input section 101 accepts input of data required to calculate air flows and pressure losses in the air pressure system in time-series responses, and outputs a piping model D2. The data described above specifically refer to data that define connections between devices of the air pressure system, data that define attributes of the devices, e.g., piping lengths, piping diameters, and the like of pipes and an air tank capacity of the air tank, and data for calculating the flow rate of air discharged from the air compressor unit 1.

The piping model storing section 102 includes a memory and a hard disk, and stores the piping model D2 output from the air tank capacity/piping system input section 101.

The predicted model constructing section 103 constructs a numerical value model capable of assessing air pressure transfer delays and pressure losses from the air compressor to the terminals from the piping model D2, and outputs a predicted model D3.

The terminal flow rate predicting section 104 calculates rates of air used by the terminals 9 through 11 from the predicted model D3, calculates a calculated value D4 of a rate of air used by all the terminals, and outputs the calculated value D4.

The compressor flow rate predicting section 105 calculates a flow rate of air discharged from the air compressor from the predicted model D3, and outputs a calculated value D5 of the flow rate of air discharged from the air compressor.

The flow rate deviation calculating section 106 calculates the difference between the rate of air used by all the terminals and the flow rate of air discharged from the air compressor from the calculated value D4 of the rate of air used by all the terminals and the calculated value D5 of the flow rate of air discharged from the air compressor, and outputs a deviation ΔQ.

Figure 3:
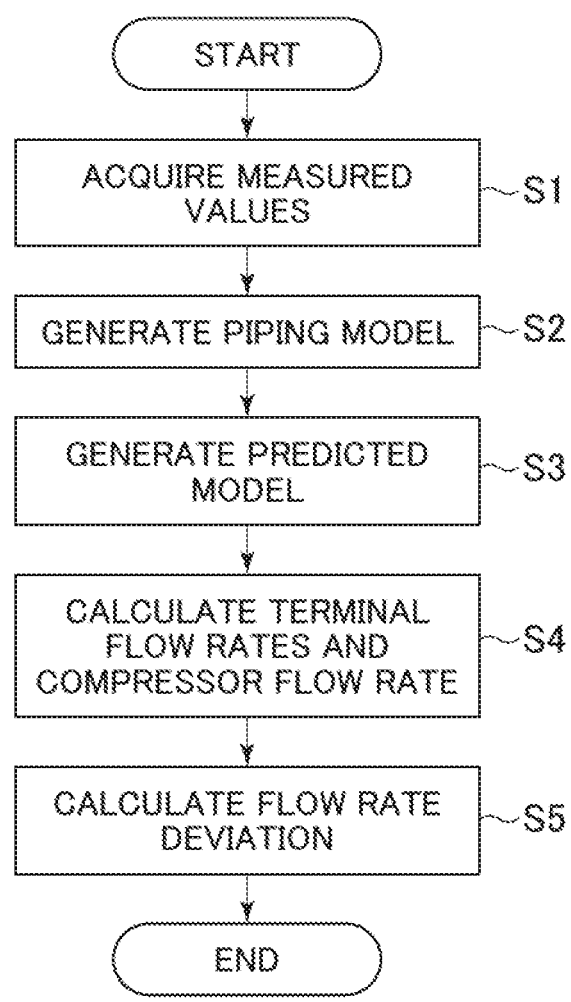
FIG. 3 is an explanatory diagram of a processing sequence of the flow rate difference calculating device in the air pressure system according to the first embodiment of the present invention.

The configuration of the air pressure system has been described above. Next, the content of processing of the flow rate difference calculating device 15 will be described in detail below. FIG. 3 is an explanatory diagram of a processing sequence of the flow rate difference calculating device 15 in the air pressure system according to the first embodiment of the present invention.

Figure 4:
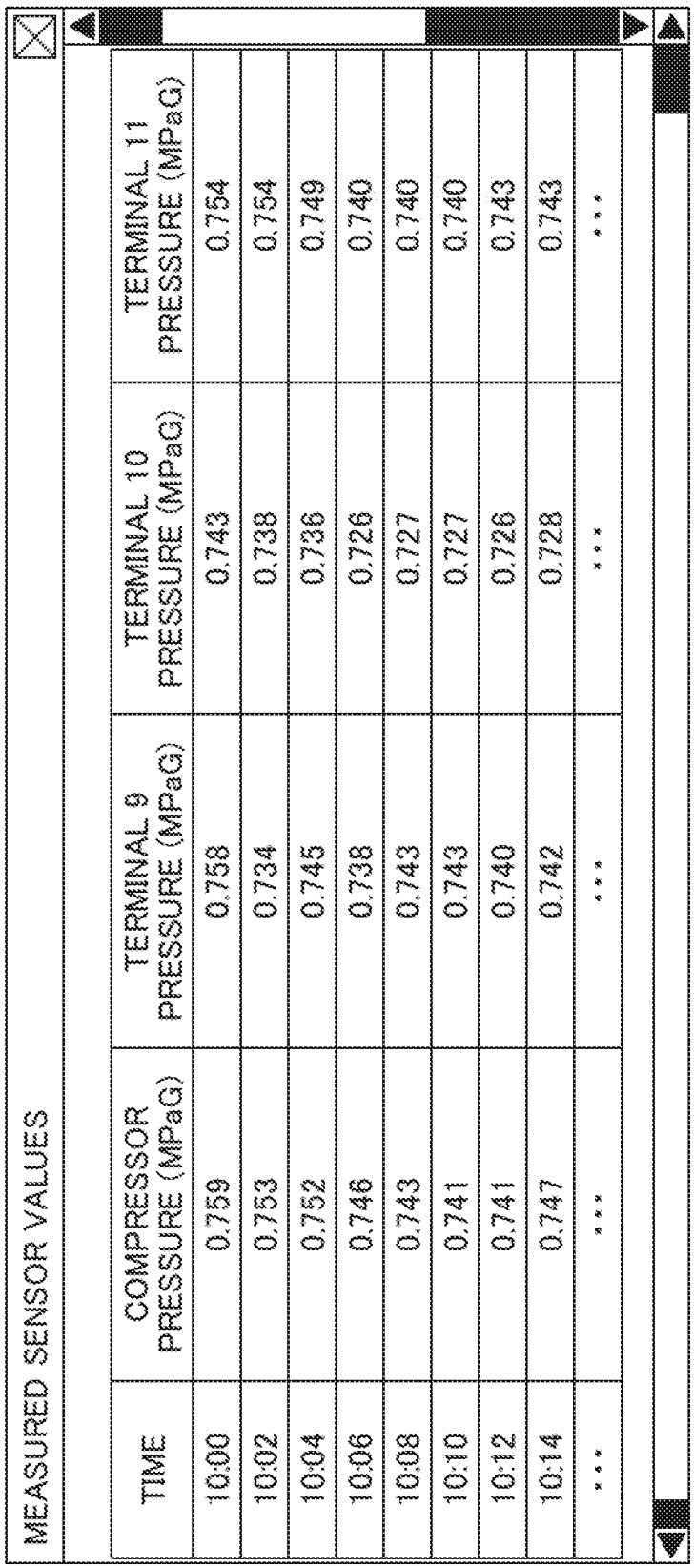
FIG. 4 is an explanatory diagram illustrating a specific example of measured time-series values acquired from respective sensors according to the first embodiment of the present invention.

In step S1, i.e., a measured value acquiring step, the measured pressure value acquiring/accumulating section 100 stores the measured pressure values acquired by the air compressor discharge-part pressure sensor 3 and the terminal pressure sensors 12 through 14 in the memory and the hard disk, and outputs measured sensor values D1. FIG. 4 illustrates a specific example in which measured values acquired from the respective sensors at sampling time intervals of two seconds are stored.

In step S2, i.e., a piping model generating step, the air tank capacity/piping system input section 101 accepts input of data required to calculate air flows in the air pressure system in time-series responses, and outputs a piping model D2. The piping model D2 is stored in the memory and the hard disk by the piping model storing section 102.

In step S3, i.e., a predicted model generating step, the predicted model constructing section 103 constructs a numerical value model capable of assessing air pressure transfer delays and pressure losses from the air compressor to the terminals from the piping model D2, and outputs a predicted model D3.

In step S4, i.e., a terminal flow rate and compressor flow rate calculating step, the terminal flow rate predicting section 104 and the compressor flow rate predicting section 105 calculates rates of air used by the terminals 9 through 11 and a flow rate of air discharged from the air compressor from the measured sensor values D1 and the predicted model D3, and outputs a calculated value D4 of a rate of air used by all the terminals and a calculated value D5 of the flow rate of air discharged from the air compressor.

In step S5, i.e., a flow rate deviation calculating step, the flow rate deviation calculating section 106 calculates the difference between the rate of air used by all the terminals and the flow rate of air discharged from the air compressor from the calculated value D4 of the rate of air used by all the terminals and the calculated value D5 of the flow rate of air discharged from the air compressor, and outputs a deviation ΔQ to the control device 4. The flow rate deviation calculating section 106 calculates the deviation ΔQ by subtracting the flow rate of air discharged from the air compressor from the rate of air used by all the terminals at each time according to the equation 1 below, for example:

$$\Delta Q_i = D4_i - D5_i \qquad \text{Equation 1:}$$

The control device 4 controls the electric motor 6 in order to eliminate the deviation ΔQ. Specifically, if the deviation ΔQ is of a positive value, then the control device 4 increases the rotational speed of the electric motor 6, and if the deviation ΔQ is of a negative value, then the control device 4 reduces the rotational speed of the electric motor 6, thereby controlling the electric motor 6 to cause the deviation ΔQ to become closer to 0. As a more detailed control process, a feedback control process such as a PID control process, for example, may be carried out, or a rotational speed of the electric motor 6 for zeroing ΔQ may be calculated and the control device 4 may control the electric motor 6 by designating the rotational speed for the electric motor 6.

An example of calculation of the difference between the rate of air used by all the terminals and the flow rate of air discharged from the air compressor according to the first embodiment of the present invention will be described below with reference to FIGS. 5 through 7.

Figure 5:
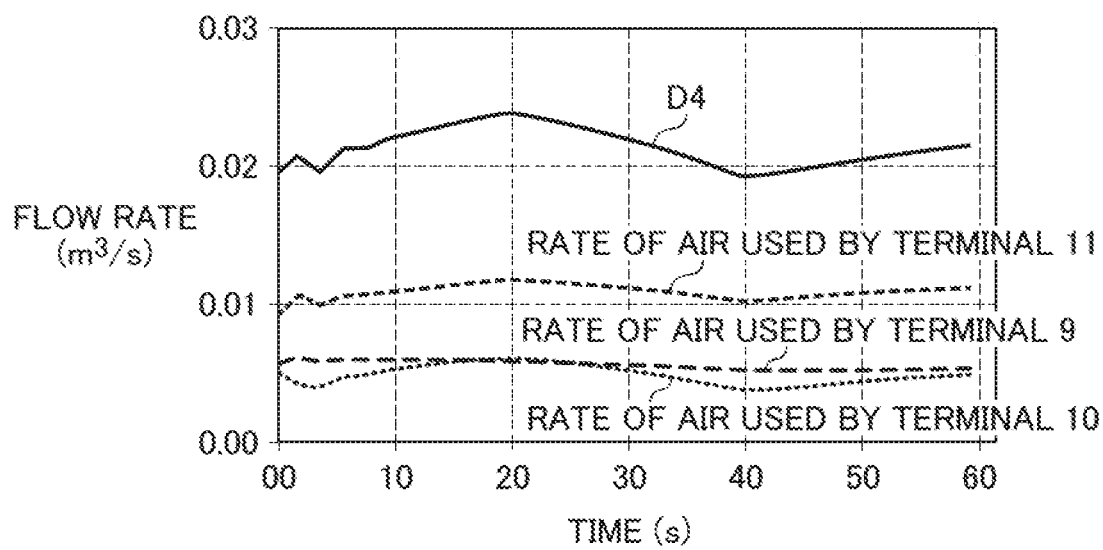
FIG. 5 illustrates calculated time-series values of rates of air used by terminals 9 through 11 and a calculated value of a rate of air used by all terminals according to the first embodiment of the present invention.

FIG. 5 illustrates an example of calculated time-series values, during 60 seconds at times 00 s through 60 s, of the rates of air used by the terminals 9 through 11, calculated by the terminal flow rate predicting section 104, and the calculated value D4 of the rate of air used by all the terminals.

Figure 6:
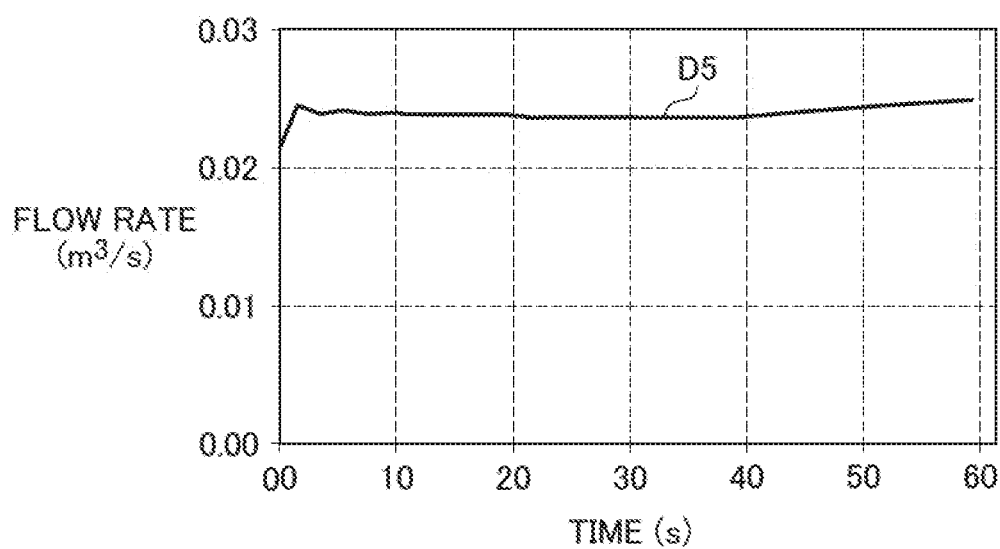
FIG. 6 illustrates calculated values of a rate of air discharged from an air compressor according to the first embodiment of the present invention.

FIG. 6 illustrates an example of calculated time-series values, during 60 seconds at times 00 s through 60 s, of the calculated value D5 of the rate of air discharged from the air compressor, calculated by the compressor flow rate predicting section 105.

Figure 7:
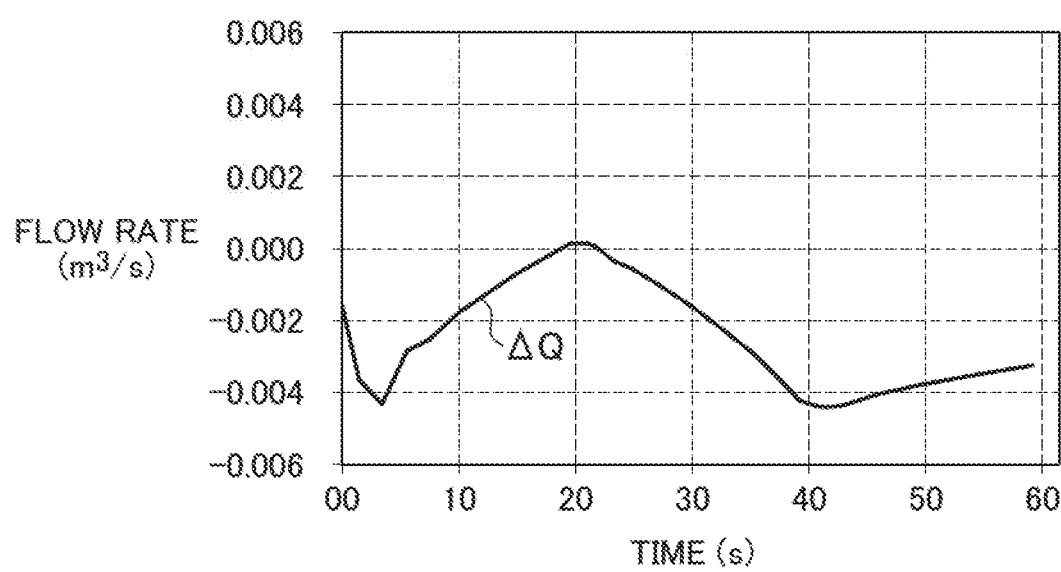
FIG. 7 illustrates calculated values of a deviation of the rate of air used by all the terminals from the rate of air discharged from the air compressor according to the first embodiment of the present invention.

FIG. 7 illustrates a result of calculated time-series values, during 60 seconds at times 00 s through 60 s, of the deviation ΔQ calculated by the flow rate deviation calculating section 106.

The details of processing of the flow rate difference calculating device 15 has been described above.

According to the present embodiment, the flow rate deviation calculating section 106 is able to control the air compressor in real time according to a method of supplying compressed air to the terminals without wastefully using compressed air in a manner in accordance with the actual usage of compressed air, from a standpoint of controlling the flow rate of compressed air supplied depending on the rate of air used by all the terminals without taking into account an indefinite relationship between the pressures of compressed air supplied to the terminals and the pressure of compressed air discharged from the air compressor.

Furthermore, in case pressure losses change abruptly, the predicted model constructing section 103 is capable of preventing unwanted electric power consumption by stably operating without response delays on the basis of a predicted model that assesses time lags of volume responses.

Moreover, according to the present embodiment, the arrangement including the terminals 9 through 11 has been described by way of example. However, the present invention is not limited to such arrangement, but is also applicable to cases where there are three or more terminals. In such cases, the pressure of compressed air supplied to each of the terminals is measured.

Second Embodiment

Figure 8:
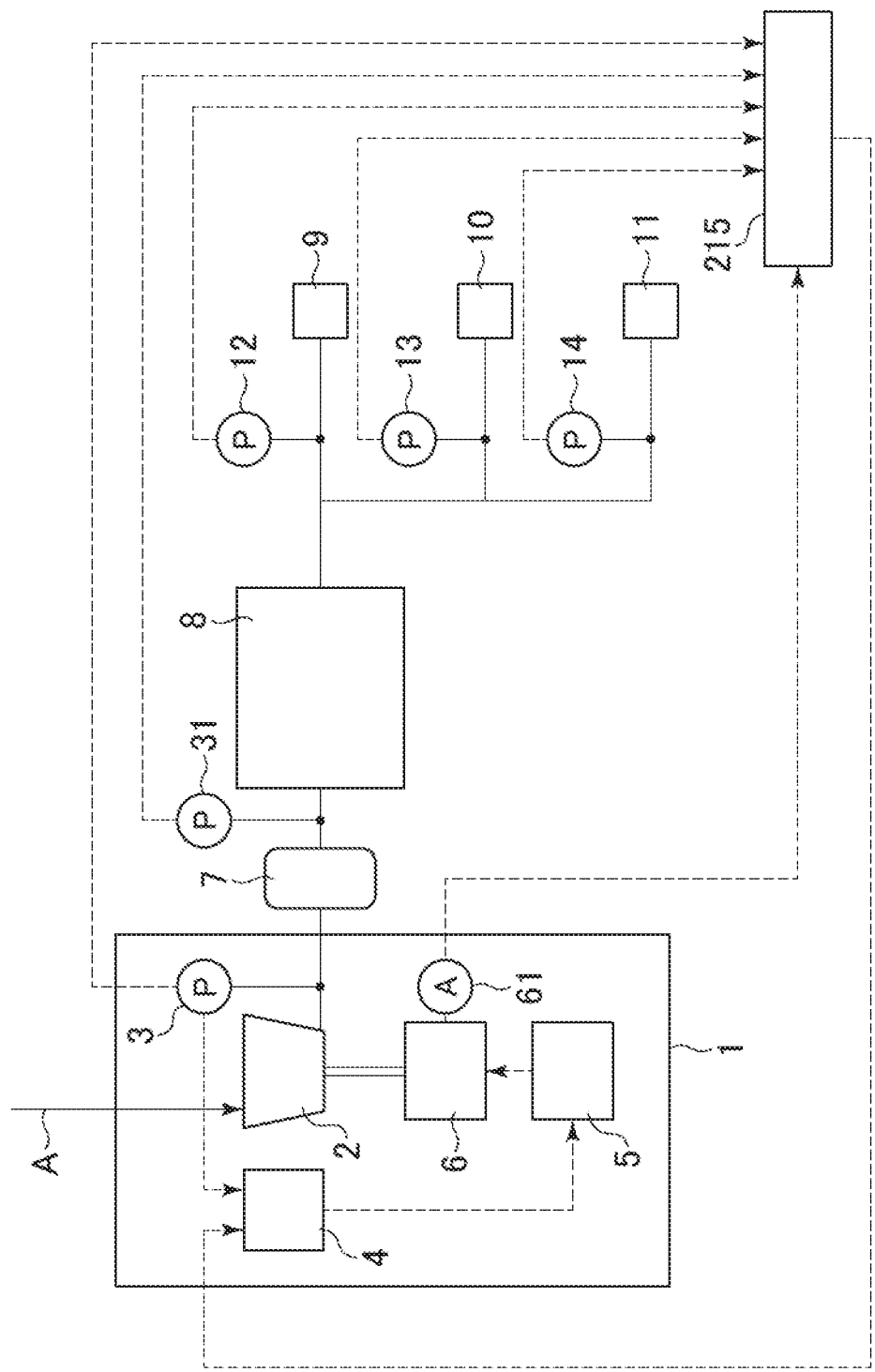
FIG. 8 is a schematic configurational diagram of an air pressure system according to a second embodiment of the present invention.

FIG. 8 is a schematic configurational diagram of an air pressure system according to a second embodiment of the present invention. Those parts which are identical to those according to first embodiment are denoted in FIG. 8 by identical reference characters used in the figures already referred to above, and their description will be omitted below.

The present embodiment is different from the first embodiment in that a pressure sensor is installed at the discharge part of the air tank 7 and an electric current sensor is installed on the electric motor 6 for acquiring a pressure at the discharge part of the air tank 7 and an operating electric current value of the air compressor main body 2. Specifically, the air pressure system according to the present embodiment newly includes an air tank pressure sensor 31 and an electric current sensor 61, and includes a flow rate difference calculating device 215 instead of the flow rate difference calculating device 15. An air tank pressure and a compressor electric current value that have been measured are input, together with the values input to the flow rate difference calculating device 15 according to the first embodiment, to the flow rate difference calculating device 215.

Figure 9:
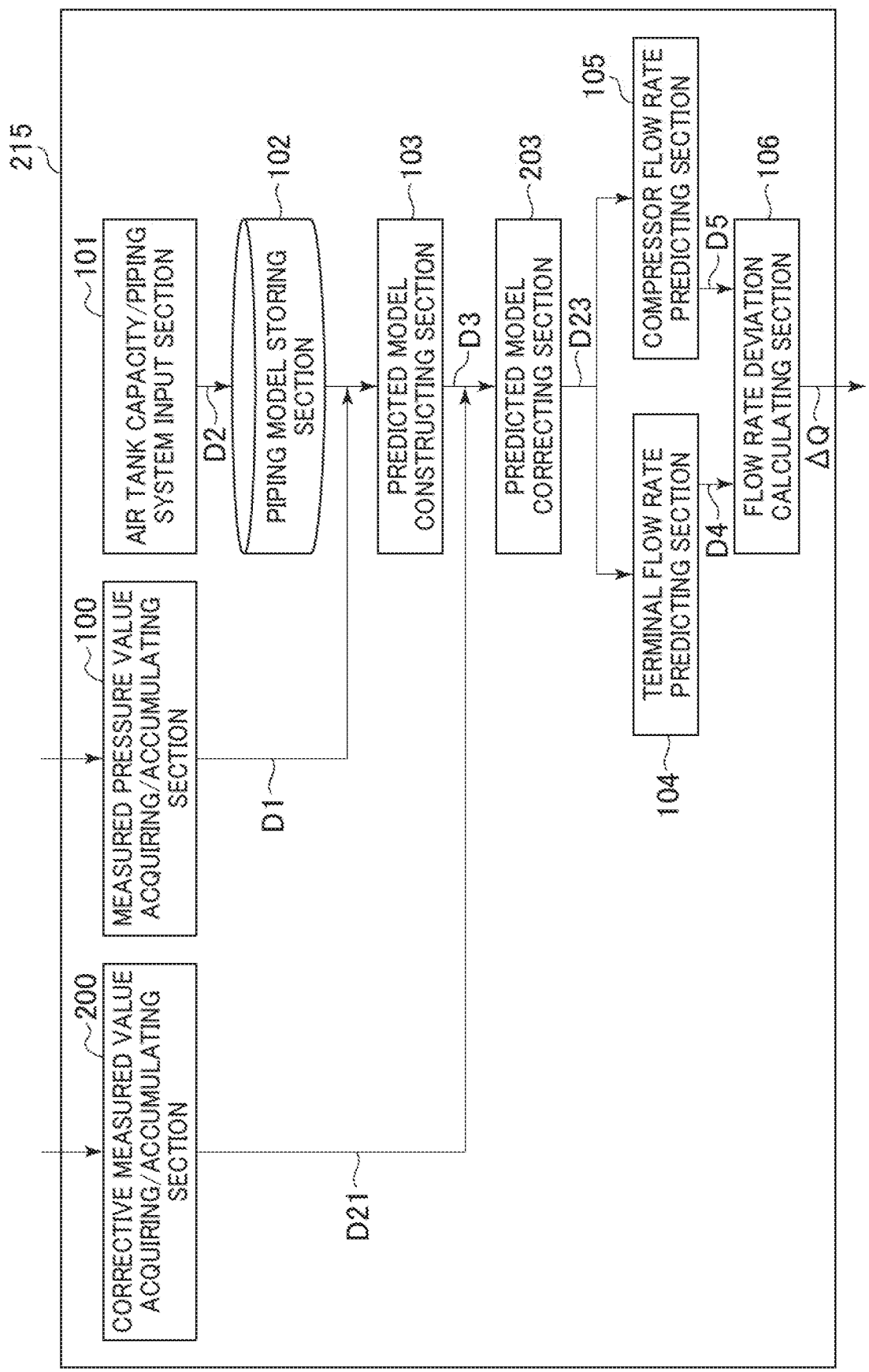
FIG. 9 is a schematic configurational diagram of a flow rate difference calculating device in the air pressure system according to the second embodiment of the present invention.

The features described above are different from the first embodiment, and the other features are the same as those of the first embodiment. Next, the flow rate difference calculating device 215 will generally be described below. FIG. 9 is a schematic configurational diagram of the flow rate difference calculating device 215 according to the second embodiment of the present invention. Those parts which are identical to those according to the first embodiment are denoted in FIG. 9 by identical reference characters used in the figures already referred to above, and their description will be omitted below.

The general configuration of the flow rate difference calculating device 215 according to the present embodiment is different from the general configuration according to the first embodiment in that the flow rate difference calculating device 215 is supplied with input represented by the pressure at the discharge part of the air tank 7 and the operating electric current of the air compressor main body 2, and newly includes a predicted model correcting section 203 for correcting a predicted model. Specifically, the configuration according to the present embodiment newly includes a corrective measured value acquiring/accumulating section 200 and a predicted model correcting section 203. The corrective measured value acquiring/accumulating section 200 acquires and stores a measured pressure value from the air tank pressure sensor 31 and a measured electric current value from the electric current sensor 61, calculates a flow rate of compressed air discharged from the compressor from the measured electric current value, and outputs a corrective measured sensor value D21. The predicted model correcting section 203 constructs a corrected model from the predicted model D3 and the corrective measured sensor value D21, and outputs a corrected model D23.

Figure 10:
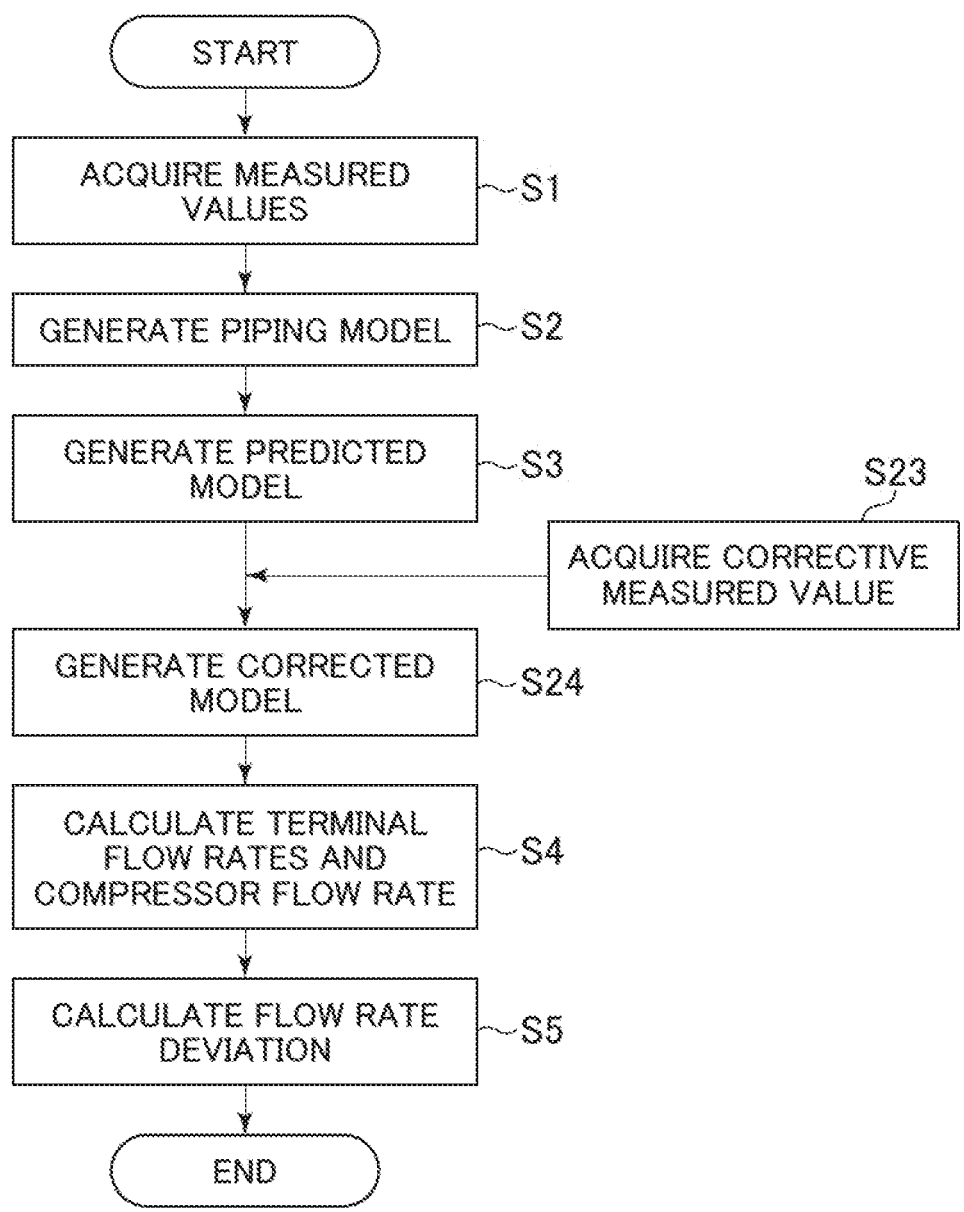
FIG. 10 is an explanatory diagram of a processing sequence of the flow rate difference calculating device in the air pressure system according to the second embodiment of the present invention.

The general configuration of the flow rate difference calculating device 215 according to the present embodiment is different from the general configuration according to the first embodiment as described above, and the other features are the same as those of the first embodiment. Next, a processing sequence of the flow rate difference calculating device 215 will be described below. FIG. 10 is a diagram illustrating a processing sequence of the flow rate difference calculating device 215 according to the second embodiment of the present invention. Those parts which are identical to those according to the first embodiment are denoted in FIG. 10 by identical reference characters used in the figures already referred to above, and their description will be omitted below.

The processing sequence of the flow rate difference calculating device according to the present embodiment is different from the first embodiment in that it includes processing steps such as step S23 and step S24 after step S3, i.e., the predicted model generating step.

In step S23, i.e., a corrective measured value acquiring step, the corrective measured value acquiring/accumulating section 200 stores a measured pressure value and a measured electric current value acquired respectively from the air tank pressure sensor 31 and the electric current sensor 61 in the memory and the hard disk, calculates a flow rate of compressed air discharged from the compressor from the measured electric current value, and outputs a corrective measured sensor value D21. It is possible to determine the flow rate of compressed air discharged from the compressor by determining the rotational speed of the electric motor 6 and the rotational speed of the air compressor main body 2 that is linked to the rotational speed of the electric motor 6, from the measured electric current value, and multiplying the rotational speed of the air compressor main body 2 by the rate of air discharged from the air compressor main body 2 per revolution.

In step S24, i.e., a corrected model generating step, the predicted model correcting section 203 corrects a deviation of measured values from calculated values, which is caused by factors including air leakage, piping deterioration, and the like, from the predicted model D3 and the corrective measured sensor value D21, corrects the predicted model, and outputs a corrected model D23. A specific calculating method for correcting the predicted model may be realized by a method such as a genetic algorithm as a known optimizing algorithm, a simulating annealing method, or the like, for example.

The processing sequence of the flow rate difference calculating device 215 according to the present embodiment is different from the flow rate difference calculating device 15 according to the first embodiment as described above, and the other features are the same as those of the first embodiment.

According to the present embodiment, the pressure sensor is installed at the discharge part of the air tank 7 and the electric current sensor is installed on the air compressor main body 2. However, one of the sensors may be installed, or the pressure senor may be installed at an optional location in the piping system. In that case, the measured value from the pressure sensor is input to the flow rate difference calculating device 215.

As described above, according to the present embodiment, in addition to the advantages obtained by the first embodiment, the pressure of compressed air discharged from the air tank 7 and the flow rate of compressed air discharged from the air compressor main body 2 are applied to the predicted model to generate a corrected model capable of correcting a deviation of measured values from calculated values, which is caused by factors including air leakage, piping deterioration, and the like, for thereby increasing the accuracy with which to calculate the calculated value D4 of the rate of air used by all the terminals in the terminal flow rate predicting section 104 and to calculate the calculated value D5 of the flow rate of air discharged from the air compressor unit 1 in the compressor flow rate predicting section 105. Therefore, the accuracy of real-time control of the air pressure system is increased.

Third Embodiment

Figure 11:
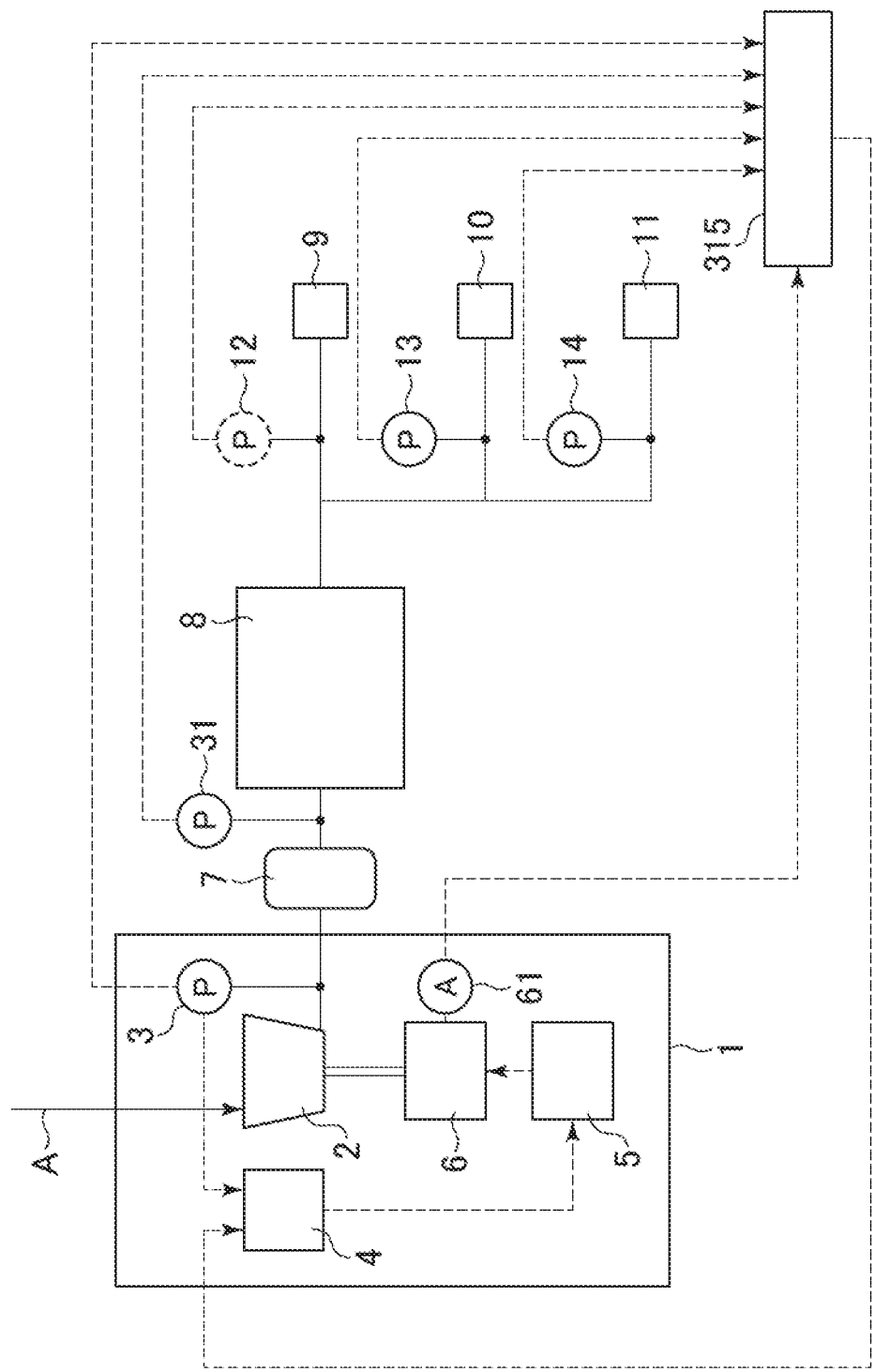
FIG. 11 is a schematic configurational diagram of an air pressure system according to a third embodiment of the present invention.

FIG. 11 is a schematic configurational diagram of an air pressure system according to a third embodiment of the present invention. Those parts which are identical to those according to second embodiment are denoted in FIG. 11 by identical reference characters used in the figures already referred to above, and their description will be omitted below.

The present embodiment is different from the second embodiment in that in case a terminal pressure sensor fails, a predicted model is constructed from a measured value from a corrective sensor and that the air pressure system includes a flow rate difference calculating device 315 instead of the flow rate difference calculating device 215. A corrective measured value such as the pressure of compressed air discharged from the air tank 7 on the basis of the value measured by the air tank pressure sensor 31, the flow rate of compressed air discharged from the air compressor main body 2 on the basis of the value measured by the electric current sensor 61, or the like, may be used as the measured value from the corrective sensor. For the description of the third embodiment, it is assumed that the terminal pressure sensor 12 indicated by the dotted line in FIG. 11 has failed.

Figure 12:
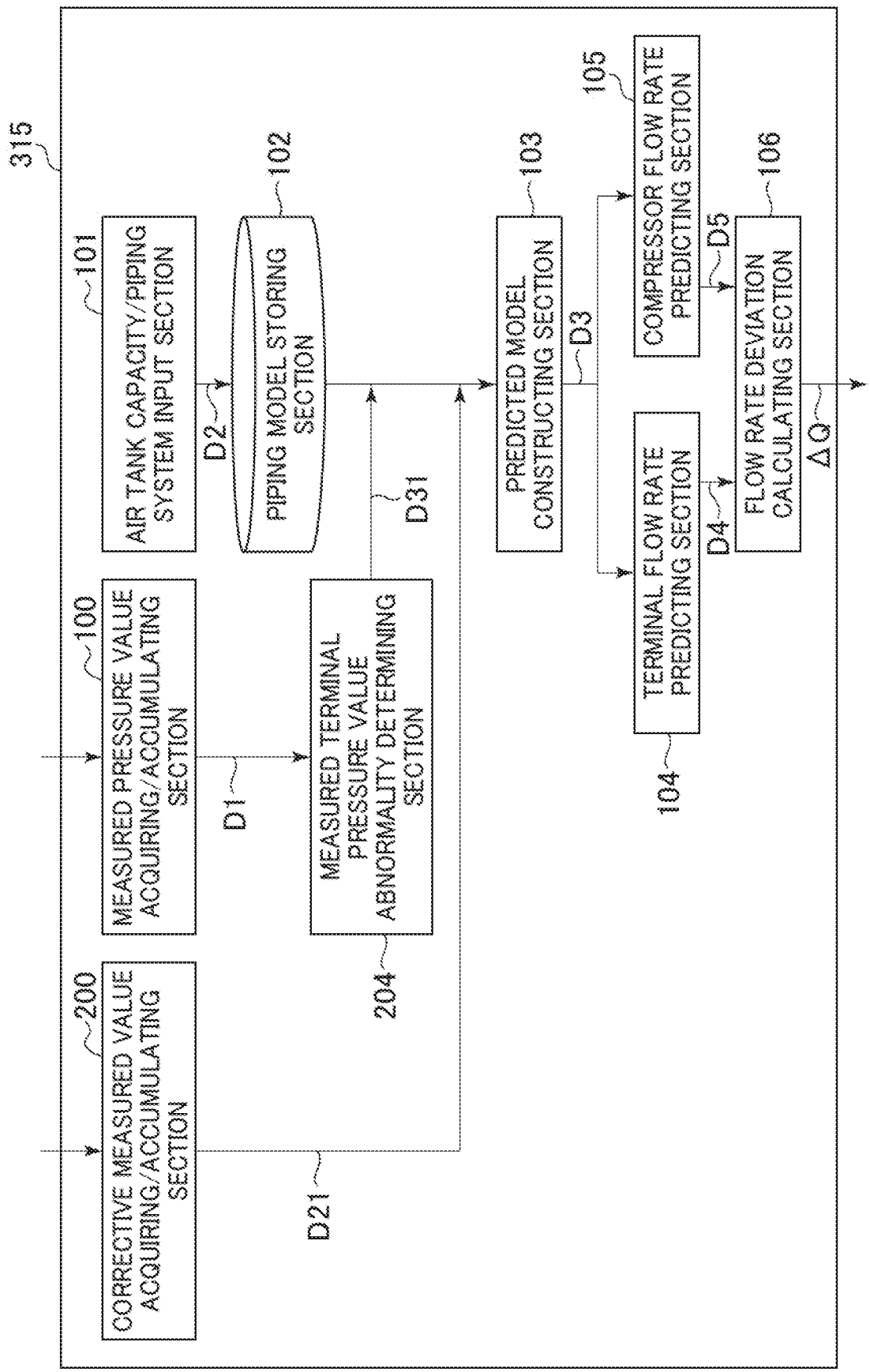
FIG. 12 is a schematic configurational diagram of a flow rate difference calculating device in the air pressure system according to the third embodiment of the present invention.

The present embodiment is different from the second embodiment as described above, and the other features are the same as those of the second embodiment. Next, the flow rate difference calculating device 315 will generally be described below. FIG. 12 is a schematic configurational diagram of the flow rate difference calculating device 315 according to the third embodiment of the present invention. Those parts which are identical to those according to the second embodiment are denoted in FIG. 12 by identical reference characters used in the figures already referred to above, and their description will be omitted below.

The general configuration of the flow rate difference calculating device 315 according to the present embodiment is different from the general configuration according to the second embodiment in that it is determined whether a measured value from the terminal pressure sensor 12 is abnormal or not and a predicted model is constructed by adding a corrective measured sensor value. Specifically, the configuration according to the present embodiment newly includes a measured terminal pressure value abnormality determining section 204. The measured terminal pressure value abnormality determining section 204 determines an abnormality of a measured terminal pressure value from the measured sensor value D1 and sends a measured value D31 from an abnormality-free sensor to the predicted model constructing section 103.

Figure 13:
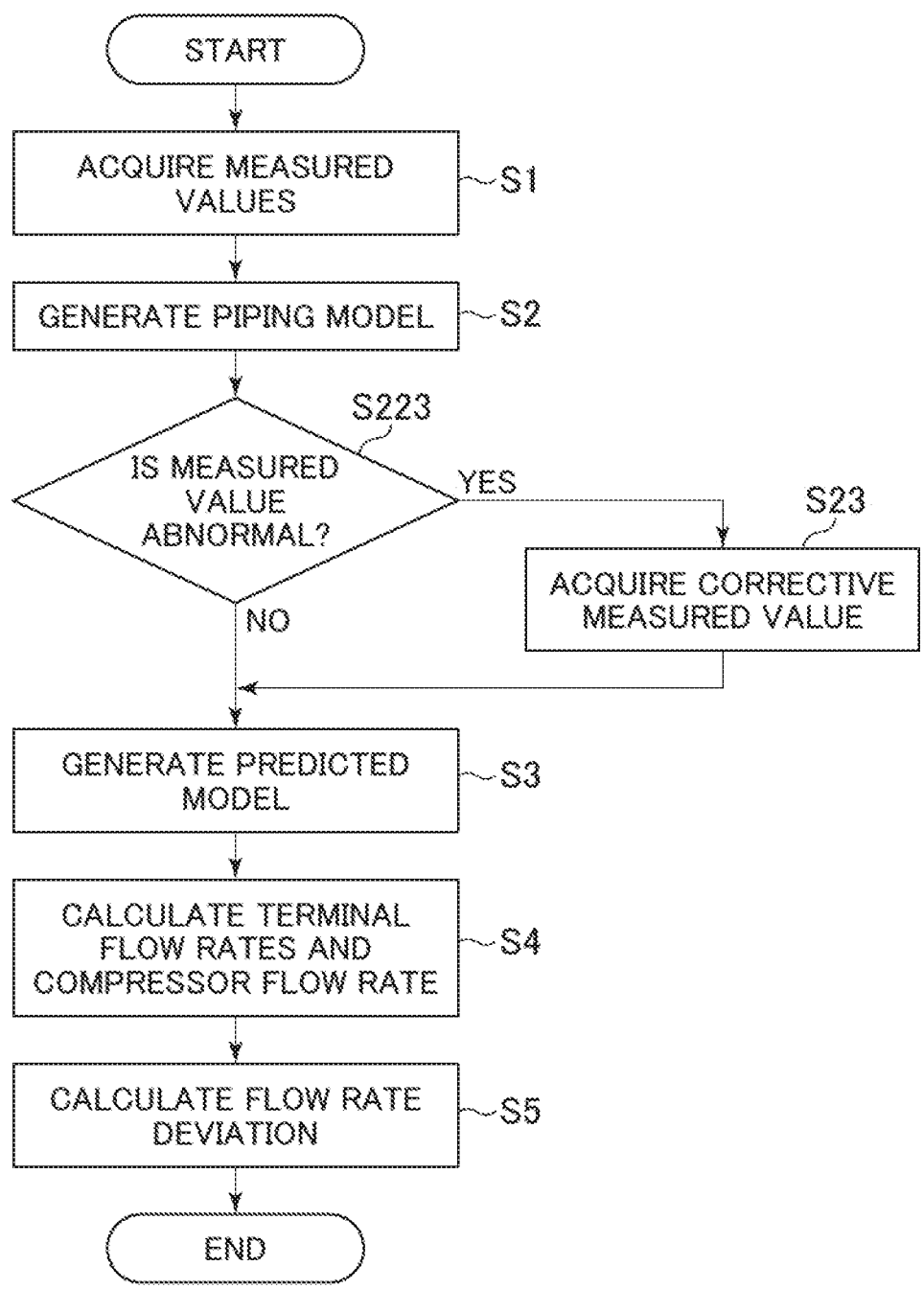
FIG. 13 is an explanatory diagram of a processing sequence of the flow rate difference calculating device in the air pressure system according to the third embodiment of the present invention.

The present embodiment is different from the second embodiment as described above, and the other features are the same as those of the second embodiment. Next, a processing sequence of the flow rate difference calculating device 315 will be described below. FIG. 13 is a diagram illustrating a processing sequence of the flow rate difference calculating device 315 according to the third embodiment of the present invention. Those parts which are identical to those according to the second embodiment are denoted in FIG. 13 by identical reference characters used in the figures already referred to above, and their description will be omitted below.

The processing sequence of the flow rate difference calculating device 315 according to the present embodiment is different from the second embodiment in that it includes a processing step such as step S223 after step S2, i.e., the piping model generating step.

In step S223, i.e., a measured value abnormality determining step, the measured terminal pressure value abnormality determining section 204 determines whether the measured value of each of the terminal pressure sensors is abnormal or not. If the determined result represents YES, then control goes to step S23, and if the determined result represents NO, then control goes to step S3, i.e., the predicted model generating step, to continue its processing.

The processing sequence of the flow rate difference calculating device 315 according to the present embodiment is different from the second embodiment as described above, and the other features are the same as those of the second embodiment.

According to the present embodiment, the air pressure system is arranged such that the terminal pressure sensor 12 fails, but it may be arranged such that any terminal sensor may fail.

As described above, according to the present embodiment, in addition to the advantages obtained by the first embodiment, in case a terminal pressure sensor fails, a predicted model is constructed using a corrective measured value such as the pressure of compressed air discharged from the air tank 7, the flow rate of compressed air discharged from the air compressor main body 2, or the like. Real-time control of the air pressure system is thus assured even in the event of a failure of a terminal pressure sensor.

Fourth Embodiment

FIG. 14 is a schematic configurational diagram of a flow rate difference calculating device 415 in an air pressure system according to a fourth embodiment of the present invention. Those parts which are identical to those according to first embodiment are denoted in FIG. 14 by identical reference characters used in the figures already referred to above, and their description will be omitted below.

The present embodiment is different from the first embodiment in that a flow rate deviation calculating section calculates the difference between the rate of air used by all the terminals and the flow rate of air discharged from the air compressor, determines whether the pressure of air supplied to each terminal is lower than a required pressure $P_0$ or not from the deviation $\Delta Q$, and corrects and outputs the deviation $\Delta Q$. Specifically, the configuration according to the present embodiment includes a flow rate deviation calculating section 406 instead of the flow rate deviation calculating section 106. The flow rate deviation calculating section 406 calculates a deviation $\Delta Q$ of the rate of air used by all the terminals from the flow rate of air discharged from the air compressor from the calculated value D4 of the rate of air used by all the terminals and the calculated value D5 of the flow rate of air discharged from the air compressor, and outputs the deviation $\Delta Q$. The deviation $\Delta Q$ is corrected such that the pressure supplied to the terminals is equal to or higher than the required pressure $P_0$. For example, the flow rate deviation calculating section 406 calculates a deviation $\Delta Q$ by subtracting the flow rate of air discharged from the air compressor from the rate of air used by all the terminals at each time and adding a corrective flow rate value $\Delta Qc$ to the difference, according to the equation 2 below, for example:

$$\Delta Q_i = D4_i - D5_i + \Delta Qc$$

$$\Delta Q_c = K(Pi - P0) \text{ (in case } P \leq Pi\text{)}$$

$$\Delta Q_c = 0 \text{ (in case } P > Pi\text{)} \qquad \text{Equation 2:}$$

where P represents a terminal pressure at the time the deviation $\Delta Q=0$ and K represents a coefficient indicating the relationship between the pressure difference and the flow rate deviation.

As described above, according to the present embodiment, in addition to the advantages obtained by the first embodiment, it is guaranteed that the pressure of air supplied to each terminal will not be lower than the requested pressure even according to a process for controlling the rate of air supplied depending on the rate of air used by the terminal.

DESCRIPTION OF REFERENCE CHARACTERS

1: Air compressor unit
2: Air compressor main body
3: Air compressor discharge-part pressure sensor
31: Air tank pressure sensor
4: Control device
5: Variable-speed device
6: Electric motor
61: Electric current sensor
7: Air tank
8: Piping system
9, 10, 11: Terminal
12, 13, 14: Terminal pressure sensor
15, 215, 315, 415: Flow rate difference calculating device
100: Measured pressure value acquiring/accumulating section
101: Air tank capacity/piping system input section
102: Piping model storing section
103: Predicted model constructing section
104: Terminal flow rate predicting section
105: Compressor flow rate predicting section
106, 406: Flow rate deviation calculating section
200: Corrective measured value acquiring/accumulating section
203: Predicted model correcting section
204: Measured terminal pressure value abnormality determining section
S1: Measured value acquiring step
S2: Piping model generating step
S3: Predicted model generating step
S4: Terminal flow rate and compressor flow rate calculating step
S5: Flow rate deviation calculating step
S23: Corrective measured value acquiring step
S24: Corrected model generating step
S223: Measured value abnormality determining step
A: Air
D1: Measured sensor value
D2: Piping model
D3: Predicted model
D4: Calculated value of a rate of air used by all terminals
D5: Calculated value of a flow rate of air discharged from an air compressor
D21: Corrective measured sensor value
D23: Corrected model
D31: Measured value from an abnormality-free sensor i: Time
K: Coefficient
$P_0$: Required terminal pressure
$\Delta Q$: Deviation
$\Delta Qc$: Corrective flow rate value

The invention claimed is:

1. An air pressure system for supplying compressed air discharged from an air compressor through an air tank and a piping system to a plurality of terminals that consume the compressed air, comprising:
   a compressor pressure sensor for measuring pressure of compressed air discharged from the air compressor;
   a plurality of terminal pressure sensors for measuring pressures of compressed air supplied respectively to the terminals;
   a flow rate difference calculating device for calculating deviation information on a basis of a capacity of the air tank, information on the piping system, the pressure of compressed air discharged from the air compressor, and the pressures of compressed air supplied respectively to the terminals; and
   a control device for controlling operation of the air compressor on a basis of the deviation information, wherein
   the flow rate difference calculating device
      is configured to calculate a rate of air used by the terminals and a flow rate of air discharged from the air compressor from the capacity of the air tank, the information on the piping system, the pressure of compressed air discharged from the air compressor, and the pressures of compressed air supplied respectively to the terminals, and
      is configured to calculate the deviation information from the rate of air used by the terminals and the flow rate of air discharged from the air compressor.

2. The air pressure system according to claim 1, further comprising:
   an air tank pressure sensor for detecting a pressure of the air tank, wherein
   the flow rate difference calculating device is configured to:
      use a measured value from the air tank pressure sensor as a corrective measured sensor value, and
      correct the rate of air used by the terminals and the flow rate of air discharged from the air compressor on a basis of the corrective measured sensor value.

3. The air pressure system according to claim 1, further comprising:
   an electric current sensor that is configured to detect an electric current supplied to an electric motor that operates the air compressor, wherein
   the flow rate difference calculating device is configured to calculate the flow rate of air discharged from the air compressor from a measured electric current value from the electric current sensor.

4. The air pressure system according to claim 3, wherein the flow rate difference calculating device is configured to:
   use the flow rate of air discharged from the air compressor as a corrective measured sensor value, and
   correct the rate of air used by the terminals and the flow rate of air discharged from the air compressor on a basis of the corrective measured sensor value.

5. The air pressure system according to claim 2, wherein in case the flow rate difference calculating device judges that one of the terminal pressure sensors is abnormal, the flow rate difference calculating device is configured to calculate the rate of air used by the terminals and the flow rate of air discharged from the air compressor on a basis of measured values from those terminal pressure sensors which are not abnormal and the corrective measured sensor value.

6. The air pressure system according to claim 1, wherein in case the deviation information indicates that the rate of compressed air supplied from the air compressor is smaller than the rate of compressed air used by the terminals, the control device is configured to increase the rate of compressed air discharged from the air compressor.

* * * * *